United States Patent

Gabler et al.

[15] 3,667,628
[45] June 6, 1972

[54] APPARATUS FOR LOADING PALLETS

[72] Inventors: Friedrich Gabler; Arthur Giordan, both of Stuttgart-Muhlhausen, Germany

[73] Assignee: Carl Drohmann GmbH, Stuttgart-Bad Cannstatt, Germany

[22] Filed: Jan. 26, 1970

[21] Appl. No.: 5,598

[30] Foreign Application Priority Data

Feb. 5, 1969  Germany .................. P 19 05 714.8

[52] U.S. Cl. ............................................ 214/6 DK, 214/6 P
[51] Int. Cl. ................................................... B65g 57/26
[58] Field of Search ............ 214/6 K, 6 P, 6 H, 6.5, 6 M, 214/6 N

[56] References Cited

UNITED STATES PATENTS

| 2,883,074 | 4/1959 | Boehl et al. | 214/6 P |
| 2,768,756 | 10/1956 | Horman | 214/6 DK |
| 2,947,405 | 8/1960 | Fenton | 214/6 P X |
| 3,007,585 | 11/1961 | Geisler | 214/6 H |
| 3,056,513 | 10/1962 | Von Gac, Jr. | 214/6 H |
| 3,520,422 | 7/1970 | Bruce et al. | 214/6 DK |
| 3,521,736 | 7/1970 | Von Gac, Jr. et al. | 214/6 P X |

FOREIGN PATENTS OR APPLICATIONS

| 1,119,770 | 12/1961 | Germany | 214/6 DK |
| 1,144,648 | 2/1963 | Germany | 214/6 DK |

*Primary Examiner*—Robert J. Spar
*Attorney*—Cushman, Darby & Cushman

[57] ABSTRACT

In an apparatus for loading pallets comprising a conveyor by which objects are introduced to the loading zone, and a ram for transferring such objects sideways on to a carrier which can be retracted to deposit the objects on to a waiting pallet, the use of a multi-part carrier associated with stop means to allow for size-adjustment and squaring-up at all four sides of an assembly of objects on the carrier.

3 Claims, 2 Drawing Figures

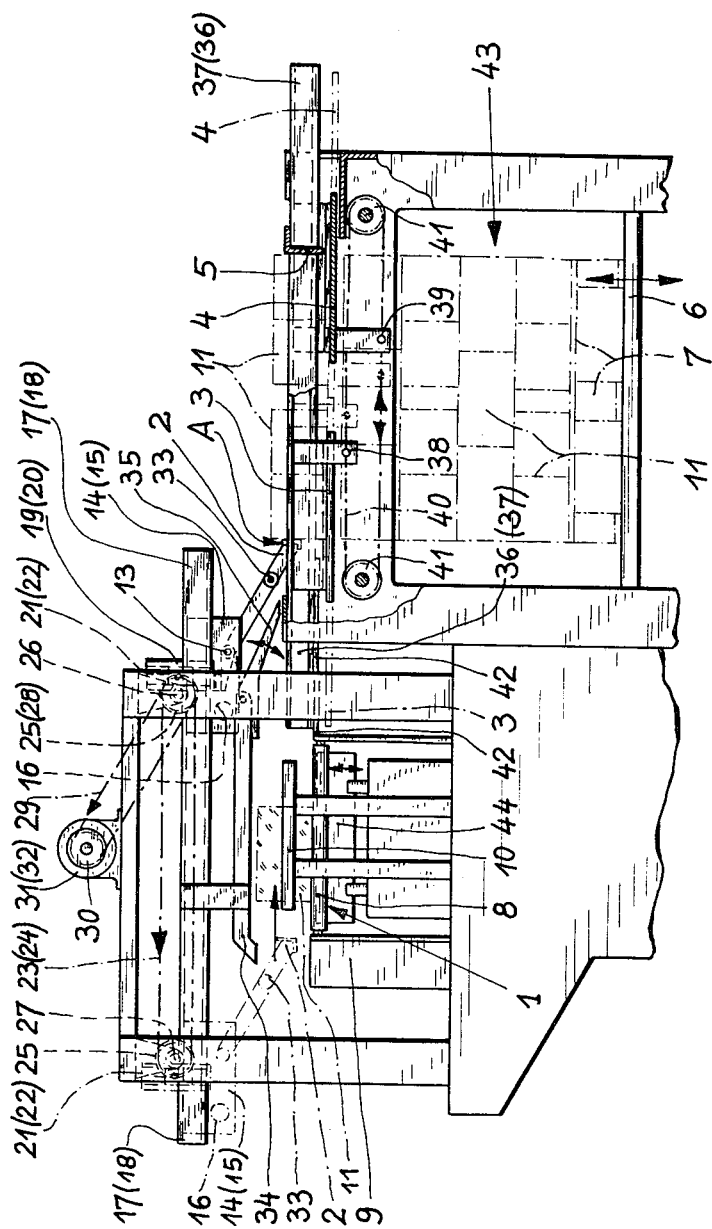

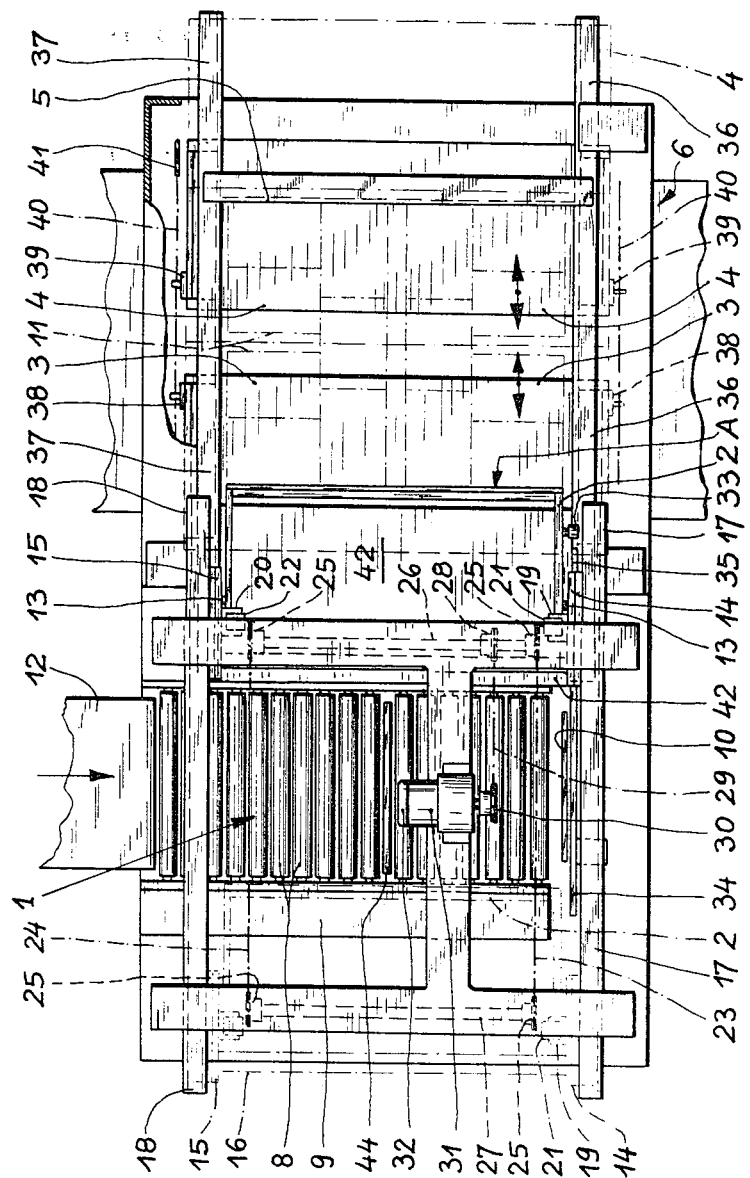

APPARATUS FOR LOADING PALLETS

BACKGROUND

1. Field of Invention

This invention relates to an apparatus for the loading of pallets with objects in a predetermined relative positioning, this apparatus comprising a conveyor track, at least one transverse ram which is movable relatively to this conveyor track, a carrier means which is arranged beside the conveyor track and is retractable, and a device for lifting and lowering the pallets.

2. Description of Prior Art.

An apparatus of this nature which is disclosed by U.S. Pat. No. 2,699,264 comprises a conveyor track with stops which are movable in controlled fashion into the path of travel of objects on this conveyor track, a ram which is movable transversely over said track, a carrier means, referred to as a stripper plate, which is arranged as a continuation of the path of transverse travel of the ram, this carrier plate being retractable beneath a stripper bar, and an elevator device arranged beneath the carrier plate for lifting pallets to be loaded, and for lowering the same in stagewise fashion. Objects disposed transversely or longitudinally are fed on to the conveyor track in selected sequence and are arrested one after another at predetermined positions by means of one or more of the stops in such a way that, where required, spaces of preselected sizes are produced between the arrested objects. These objects are then shifted on to the carrier plate, transversely in relation to the direction of introduction on to the conveyor track, by means of the transverse ram. This procedure is repeated until a predetermined number of objects rests on the carrier plate. This plate is then pulled away from beneath the stripper bar and the objects restricted as regards sideways movement by this stripper bar. The objects then drop, in the disposition in which they have been set, on to a pallet which is presented ready by the elevator device.

Using this apparatus it is not, however, possible also to dispose the objects at a predetermined spacing from one another in a direction transversely in relation to the direction of the conveyor track, thereby to cater for a squaring up of the assembly of objects so that the stack has flush surfaces at all four sides. This squared-up arrangement is however desirable because otherwise there will be the danger that when the stacks are placed side-by-side and despatched, the objects of adjacent stacks might "hook" into one another. When stacks affected in this way are subsequently separated from one another, individual objects may conceivably be pulled away from their fellows and as a result the stack may possibly collapse.

German Auslegeschrift 1,283,747 discloses an apparatus which is aimed at avoiding this shortcoming. Instead of the carrier plate of U.S. Pat. No. 2,699,264, the apparatus of the German specification provides two carrier members which come alternately into effective operation and each of which comprises a number of carrier bars which are attached to conveyor chains. The apparatus further includes two pusher elements which alternate with one another to transfer objects on to the carrier members, and in addition stops above the carrier members at preselected distances from one another which can be lowered in controlled fashion and are co-ordinated with a device for lifting and lowering the pallets. The carrier means, which comprises carrier bars, can be driven in controlled fashion so as to travel in stepwise fashion through distances of predetermined size.

In this known apparatus the objects delivered on to a first conveyor track are further conveyed a predetermined distance after being transferred on to one of the two alternately-effective carrier members so that objects subsequently pushed on to this carrier member are spaced by gaps of predetermined size from the first-mentioned objects. The depressible stops enter these gaps, whereafter the carrier member beneath the objects can be pulled away; these objects then drop on to a pallet which is standing ready without varying their relative positioning.

The technical outlay required for the construction of such an apparatus is comparatively large, particularly where it is to cater for a plurality of patterns of deposited objects.

It is an object of this invention to reduce this cost and to provide an apparatus of the type stated above which is also able to furnish stacks of objects which have flush faces at all sides.

SUMMARY OF THE INVENTION

To these ends, in the present invention the carrier means comprises two relatively-movable parts with working surfaces which are uniplanar in the situation which they occupy to receive the objects, these parts being arranged beneath at least one associated stop and being adapted for relative parting movement.

Preferably the two parts of the carrier means are adapted for relative parting movement in the direction of operation of said transverse ram in shifting objects on to said carrier means.

Advantageously there is one associated stop which is fixedly arranged, whilst means are provided to hold said transverse ram in a pre-selected position to constitute a second stop. It is also possible to have the two parts of the carrier means relatively movable transversely to the direction of travel of the transverse ram.

A further preferred feature of the apparatus according to the invention lies in having the two parts of the carrier member in the form of plates; these may be of the same length and be disposed symmetrically in relation to the pallets. In another arrangement the carrier plates may be of the same length and temporarily disposed non-symmetrically in relation to the pallets; a further modification of the invention resides in having carrier plates of unequal lengths.

Using the apparatus according to the invention it is possible to stack objects on pallets without any additional technical outlay, it being possible, if desired, to have gaps automatically forming approximately centrally of the pallet between the objects when the plates are moved apart. Moreover the time required to transfer the objects to the pallet is shorter than when using one carrier plate only.

BRIEF DESCRIPTION OF THE DRAWINGS

An embodiment of apparatus according to the invention will now be described with reference to the accompanying drawings, in which:

FIG. 1 is a side view of the apparatus, and

FIG. 2 is a plan view of the same.

DETAILED DESCRIPTION OF THE PREFERRED EMBODIMENT

In the embodiment illustrated the apparatus primarily comprises a conveyor track 1, a ram 2 which is transversely movable across this conveyor track 1, two relatively movable carrier plates 3 and 4, a fixed stop 5 above carrier plate 4, and a device 6 for the lifting and controlled lowering of pallets 7 to be loaded.

The conveyor track 1 is made up of a number of conveyor rollers 8 driven in known fashion through a gearing in gear case 9 from a conventional drive source (not shown). A stop 10 is provided at the end of the path of travel of objects on the track 1, this being used for arresting objects 11 which have been conducted to the conveyor track 1 by a supply device 12. This device 12 is of such a nature that objects 11 can be transferred thereby to the conveyor track 1 in a predetermined sequence, longitudinally or transversely orientated.

The transverse ram 2 is mounted on two slides 14, 15 by means of two bolts 13. These slides 14, 15, which may be interconnected by a cross piece 16, are displaceably mounted in guide rails 17, 18. Further guide rails 19, 20 are provided on slides 14 and 15 and have driving elements 21 and 22 reciprocable therein. These elements 21, 22 are connected to chains 23, 24 which are guided by chain wheels 25 so as to transcribe an elongated oval path of travel with straight portions extending horizontally and parallel to the first-mentioned guide rails 17, 18. The chain wheels 25 are arranged in pairs on horizontally disposed shafts 26, 27. Shaft 26 is driven through a chain wheel 28, a chain drive 29 and a further chain wheel 30 with a motor 31 having a built-in brake 32. Motor 31 can be started by a known form of control means. This motor 31 and the operation of brake 32 are in each case controlled by detectors (not shown) which are arranged along the path of displacement of one of the slides 14, 15, such that the relevant chain 23 or 24 is arrested when that part of chain 23 or 24 which engages the driving element 21 or 22, is on a reversing curve of the chain concerned, i.e. slides 14, 15 are in an end position. A roller 33 is arranged on the transverse ram 2. A conductor rail 34 is provided below guide rail 17. A tongue 35 is pivotally mounted at the end of the conductor rail 34 which is nearest the carrier plates 3, 4, this tongue being gravity-biased downwards.

The two carrier plates 3, 4 are displaceably mounted on further guide rails 36, 37 parallel to the rails 17, 18. Connected to the carrier plates 3, 4 are driving elements 38, 39. Engaged with these elements 38, 39 are chains 40 which again are guided by chain wheels 41 so as to transcribe an elongated oval shape of which the "straight sections" extend parallel to the guide rails 36, 37. The chains 40 are adapted to be driven in alternate directions in known fashion and to shift the carrier plates 34 alternately towards one another and apart.

A device 6 for the raising and controlled lowering of pallet 7 is arranged beneath the carrier plates 3, 4, as brought together, this being of a known form of construction and working in coordination with the stop 5.

The apparatus described operates as follows:

When a predetermined number of objects 11 have been collected in predetermined orientation on the conveyor track 1, the motor 31 is started; slides 14, 15 are moved from one end position transversely in relation to the conveyor track 1 in the direction of the carrier plates 3, 4 and then, after passing through the second end position, are stopped in the first again by means of the brake 32. The transverse ram 2, disposed in its lowered position, is moved in over the conveyor track 1 and shifts the objects over a support plate 42 on to the adjacent carrier plate 3. In the course of this action the roller 33 travels beneath the conductor rail 34 and the tongue 35, which is temporarily lifted. During the return movement the roller 33 on the transverse ram 2 travels along the upper side of tongue 35 and pivots the ram 2 into an upper position. During further travel the roller 33, and with it the transverse ram 2, is held through the agency of the conductor rail 34 in the upper position until the ram has passed over conveyor track 1. In the meantime a fresh supply of objects 11 has been deposited in predetermined disposition on the conveyor track 1. When a predetermined number of such objects has been assembled on the trackway these are in turn shifted by the transverse ram 2 to the carrier plates 3, 4 in the manner described above.

This procedure is repeated until the required number of objects 11 are disposed on the relatively movable carrier plates 3, 4. The ram 2 is then held for an appropriate period of time in the second end position, which corresponds to a predetermined coordination with the device 6 for lifting pallet 7, and here it acts temporarily as a stop. This position of ram 2 is shown in full line in the drawings, where the reference A has been used to identify it as a stop. The two carrier plates 3, 4 are now drawn back apart, with the assistance of chains 40, beneath stop 5 and the transverse ram 2 which is temporarily acting as stop A. As a result the objects 11 are first moved in opposite directions against the stops A, 5 so as to define gaps approximately centrally of the pallet 7 standing ready. These gaps represent the difference between the sum of the dimensions of the objects 11, which have been shifted over, and the distance between the two stops A, 5, namely the loading area of pallet 7. During further movement apart of carrier plates 3, 4 the objects 11 drop successively on the pallet 7, which has been raised by the lifting mechanism 6, or on to a layer of objects 11 which is already present on the pallets.

The pallet 7 is then lowered an amount corresponding to the height of the objects 11, and the carrier plates 3, 4 are moved towards one another again so that, after a repetition of the transfer procedure described above, another layer of objects 11 can be deposited on the pallet 7; ultimately there is a stack 43 of objects 11 with the sides thereof, parallel to the stops A, 5, defined by flush surfaces.

The carrier plates 3, 4 may either be of the same or unequal lengths. Equal lengths are preferred when there is an even number of objects 11 in the direction of movement of the carrier plates 3 and the gap to be provided is required in the middle of such a row of objects 11. Carrier plates of unequal length are preferred where there is an odd number of objects 11 in a row and the gaps are to be correspondingly provided. It would also be possible in this event to use carrier plates 3, 4 of equal length and to direct them in such a way that, when they are in the position in which they abut against one another at least temporarily there are unequal lengths projecting beneath the stops A, 5 with which they are associated.

Likewise it would be possible to return the transverse ram 2 into its starting position directly after it has made a transfer stroke and to provide a special stop which is movable at the end of the transfer travel, or in pre-selectable coordination with the pallet 7 to be loaded.

In instances where it might be required to provide gaps between the objects 11 such that the latter are spaced from one another in the direction of conveyance on the conveyor track 1, further stops 44 may be provided and be adapted for movement into the path of travel on this track 1.

For the purpose of securing certain predetermined types of layout of objects the carrier plates 3, 4 may be arranged in such a way that their movement is transverse to the direction of thrust of the transverse ram 2.

We claim:

1. Apparatus for loading pallets with a plurality of objects in at least one layer that includes at least two objects adjacent one another in a first horizontal direction comprising:

means for conveying at least one said object at a time to a transfer point;

a pallet lifting and lowering device including a pallet support spaced from said transfer point in said first horizontal direction, said pallet support including means for removably supporting a pallet thereon in a predetermined spatial relation, in position to receive objects transferred thereto;

object carrier means including two individual, upwardly facing support surface means, each support surface means having an extensiveness in said first direction which is sufficiently great as to permit that support surface to support at least one said object;

means for moving the two object carrier support surface means between;

a first position wherein the two object carrier support surface means are substantially horizontal and coplanar, lie immediately adjacent one another in said first direction and are disposed over the pallet support; and a second position wherein the carrier support surface means are spaced away from one another, and each from the first position thereof, in said first direction, by an amount at least equal to the total dimension in said first direction of the at least two objects which are to be loaded in one layer on a pallet carried by said pallet lifting and lowering device support surface means;

transfer means successively engageable with each at least one object at said transfer point and retractably movable in such sense as to transfer the particular at least one object at said transfer point, in said first horizontal direction directly onto said object carrier means in order to load the object carrier means with a layer that includes at least two objects adjacent one another in said first horizontal direction; and first and second stop means respectively engageable with the foremost and hindmost extremes of the layer of at least two objects adjacent one another in said first horizontal direction on said object carrier means; said first and second stop means, while acting, being so disposed relative to said object carrier means than when the two object carrier support surface means are retracted to the second position thereof, the layer of at least two objects adjacent one another in said first horizontal direction drops onto said pallet support with the foremost and hindmost extremes thereof maintained by said stop means in a uniform, predetermined disposition relative to the pallet support, whereby pallets may be loaded with squared-up foremost and hindmost extreme sides even though the total dimensions of layers of said articles in said first horizontal direction may vary from layer to layer, the second stop means being engageable with the hindmost extreme of the layer of at least two objects adjacent one another in said first horizontal direction is constituted by surface means on said transfer means together with means for locking said transfer means in a predetermined spatial relation as said object carrier means support surface means are retracted in said first horizontal direction from the first position thereof to the second position thereof.

2. The apparatus of claim 1 wherein the object carrier means comprises two flat plates having said upwardly facing support surface means thereof as the respective upper surfaces thereof.

3. The apparatus of claim 2 wherein the object carrier means plates are of equal length in said first horizontal direction and are symmetrically disposed relative to the pallet support in the first position of said carrier means plates and wherein the means for moving the object carrier means moves said object carrier plates at substantially equal rates from the first position thereof toward the second position thereof.

* * * * *

UNITED STATES PATENT OFFICE
CERTIFICATE OF CORRECTION

Patent No. 3,667,628                     Dated June 6, 1972

Inventor(s) Friedrich Gabler and Artur Giordan

It is certified that error appears in the above-identified patent and that said Letters Patent are hereby corrected as shown below:

Title page, designation of inventors, read:

--[72] Inventors: Friedrich Gabler of Stuttgart-Munster, and Artur Giordan of Stuttgart-Muhlhausen, Germany--

Signed and sealed this 12th day of September 1972.

(SEAL)
Attest:

EDWARD M. FLETCHER, JR.
Attesting Officer

ROBERT GOTTSCHALK
Commissioner of Patents